US 6,635,825 B2

(12) United States Patent
Adachi

(10) Patent No.: US 6,635,825 B2
(45) Date of Patent: Oct. 21, 2003

(54) STRUCTURE FOR WIRING A WIRE HARNESS BETWEEN AN AUTOMOBILE BODY AND A MOBILE ARTICLE, AND A METHOD OF PROTECTING AN ELECTRIC WIRE GROUP OF A WIRE HARNESS

(75) Inventor: Masatoshi Adachi, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/793,917

(22) Filed: Feb. 28, 2001

(65) Prior Publication Data
US 2001/0020539 A1 Sep. 13, 2001

(30) Foreign Application Priority Data
Feb. 29, 2000 (JP) .......................................... 2000-052921

(51) Int. Cl.$^7$ ................................................. H01B 7/40
(52) U.S. Cl. ........................ 174/72 A; 174/135; 174/136
(58) Field of Search ............................. 174/72 A, 135, 174/136, 102 R, 70 C, 70 R, 108, 163 R; 191/22 R, 23 R, 30, 35

(56) References Cited

U.S. PATENT DOCUMENTS

| 3,444,701 A | * | 5/1969 | Randolph ................... 248/74.1 |
| 3,762,982 A | * | 10/1973 | Whittington ................. 138/110 |
| 4,929,478 A | * | 5/1990 | Conaghan et al. ........... 138/103 |
| 5,106,040 A | * | 4/1992 | Cafmeyer et al. ......... 248/292.14 |
| 5,367,126 A | * | 11/1994 | Kikuchi ....................... 174/135 |
| 5,579,809 A | * | 12/1996 | Millward et al. ............. 138/129 |
| 5,912,437 A | * | 6/1999 | Mazaris ........................ 174/135 |
| 5,940,962 A | * | 8/1999 | Shima et al. ............. 174/105 R |
| 6,034,329 A | | 3/2000 | Kawamura |
| 6,038,819 A | * | 3/2000 | Klein ............................. 49/116 |
| 6,060,663 A | | 5/2000 | Hier et al. |
| 6,085,416 A | * | 7/2000 | Ikeda ............................ 174/36 |
| 6,131,991 A | * | 10/2000 | Sugitani .................... 296/146.8 |
| 6,156,973 A | * | 12/2000 | Ushiyama et al. ........ 174/101.5 |
| 6,161,894 A | * | 12/2000 | Chapman .................... 296/155 |
| 6,180,886 B1 | * | 1/2001 | Krane et al. ................. 174/135 |
| 6,318,785 B1 | * | 11/2001 | Tousignant .................... 296/75 |
| 6,323,428 B1 | * | 11/2001 | Takano .................... 174/117 F |

FOREIGN PATENT DOCUMENTS

| JP | 4-101216 | 9/1992 |
| JP | 9-163542 | 6/1997 |

OTHER PUBLICATIONS

English Language Abstract of JP 9–163542.

* cited by examiner

Primary Examiner—Dean A. Reichard
Assistant Examiner—Jinhee J Lee
(74) Attorney, Agent, or Firm—Greenblum & Bernstein, P.L.C.

(57) ABSTRACT

A structure for wiring a wire harness between an automobile body and a mobile article is provided. The wire harness is wired by being bent between the mobile article which is configured for movement relative to the automobile body, and is flexibly moved in accordance with the motion of the mobile article. The structure includes a spiral tube made of a synthetic resin which is wound and sheathed on an electric wire group of the wire harness that is bent and wired at a transition portion between the automobile body and the mobile article. The sheathing material may be used for the transition portion of the wire harness wired from an automobile body to a mobile article such as door, seat and the like.

9 Claims, 5 Drawing Sheets

Fig. 5(A)
PRIOR ART
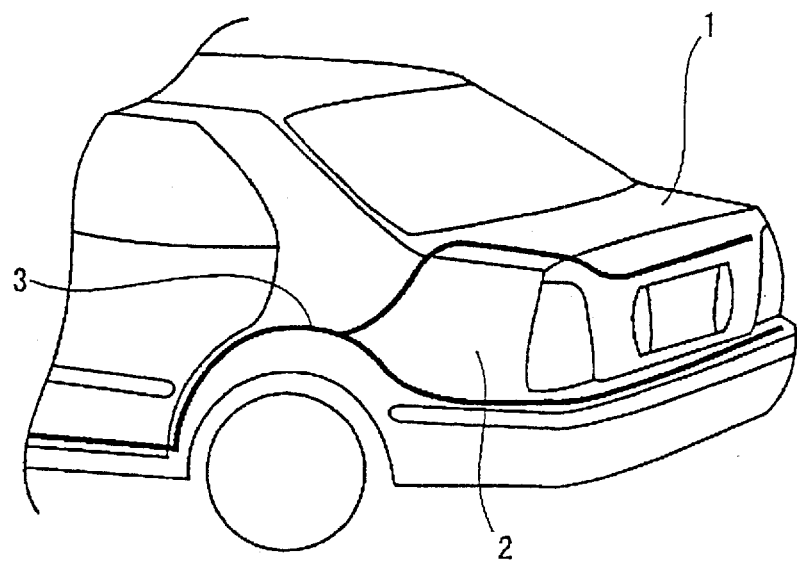
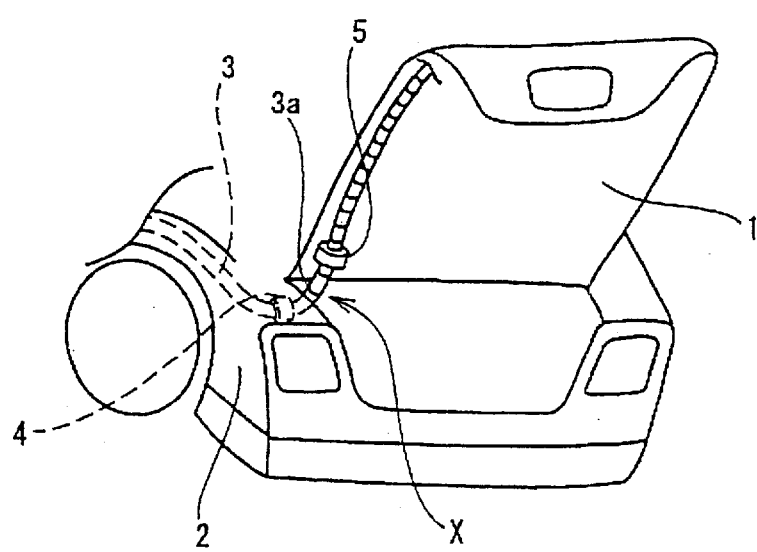
Fig. 5(B)
PRIOR ART

STRUCTURE FOR WIRING A WIRE HARNESS BETWEEN AN AUTOMOBILE BODY AND A MOBILE ARTICLE, AND A METHOD OF PROTECTING AN ELECTRIC WIRE GROUP OF A WIRE HARNESS

BACKGROUND OF THE INVENTION

1. Field of the Invention

The present invention relates to a structure for wiring a wire harness between an automobile body and a mobile article such as a door, a seat or the like. Particularly, the structure is suitably used for portions subject to bending of the wire harness at a transition portion between an automobile body and a door, for example, in a floor wire harness wired from the automobile body to a luggage door (a door for opening and shutting a luggage compartment).

2. Description of Background Information

As shown in FIG. 5B, a floor harness 3 is wired from an automobile body 2 to a luggage compartment door 1 (hereinafter, referred to as a door 1) of an automobile. At a transition portion X, where the door 1 is opened and closed relative to the automobile body 2 side, the wire harness is fixed on the automobile body 2 by a clamp 4, fixed on the door 1 by a clamp 5, a wire harness portion 3a is bent and wired between the interval, and the wire harness portion 3a is subject to elongation during opening motion of the door 1.

Since the above-mentioned transition portion X is a portion which is viewed during opening of the door 1, a sheathing material is required to be installed from the viewpoint of protection of the electric wires from interference with a surrounding member together with the desire that the electric wires are not made visible. Accordingly, as shown in FIG. 6, a tape T has been conventionally wound upon the electric wire group by half-wrap winding to provide a sheath.

Further, a branch line (not shown) may be flexibly wired from a floor wire harness to a seat between the floor and the seat which is installed on the floor in a condition in which the seat can be moved back and forth. The branch line is bent and elongated in response to the back and forth movement of the seat, and the branch line is also sheathed by tape winding.

However, there are problems in that flexibility is lost when a tape is wound around electric wire groups by half-wrap winding, damage is apt to occur and the function as a protective material is inferior when the tape interferes with a surrounding member, and the appearance is rather unattractive.

A sheathing utilizing a corrugated tube having flexibility can be considered in place of the half-wrap winding of a tape, but there is a problem that cracking is apt to occur in the corrugated tube due to repetition of bending motion under low temperature conditions. The present inventor performed a test in which an opening and closing operation of 9000 times was carried out under a temperature condition of −30° C., and at an opening and closing rate of 3 seconds per cycle. As a result, cracking of the corrugated tube occurred.

In consideration of the above-mentioned problems, the present invention was developed, and it is an object of the present invention to provide a sheathing material for a transition portion from an automobile body to a door, or a transition portion from an automobile body to a seat that is not damaged by the bending motion of the wire harness, and which is resistant to the occurrence of damage by a interfering material, as well as the occurrence of cracking at a low temperature, and further to provide a good appearance.

SUMMARY OF THE INVENTION

In order to solve the above-mentioned problems, the present invention provides a structure for wiring a wire harness between an automobile body and a mobile article. The wire harness is bent and wired between the mobile article, which is configured for movement relative to the automobile body, and is flexibly moved in accordance with the motion of the mobile article. In particular, a spiral tube, for example, made of a synthetic resin, is wound and sheathed on an electric wire group of the wire harness which is bent and wired at a transition portion between the automobile body and the mobile article.

According to one aspect of the present invention, the mobile article is a door configured to be opened and closed against the automobile body, and an outer periphery of the electric wire group of the wire harness is sheathed, at a transition portion between the automobile body and the door, with the spiral tube. Particularly, it is preferable that the transition portion of a floor harness wired from the automobile body to a luggage door is sheathed with the spiral tube.

In another aspect of the present invention, the mobile article is a seat configured to be moved relative to the automobile body, and an outer periphery of the electric wire group of the wire harness is sheathed, at a transition portion between the automobile body and the seat, with the spiral tube.

According to a further aspect of the present invention, the spiral tube is a tube obtained by preliminarily forming a narrow belt article having a width of about 10 mm and a thickness of about 1 to 2 mm which is formed of a synthetic resin material, for example of a polyethylene and the like, into a spiral shape. When the spiral tube is spirally wound on the outer periphery of an electric wire group constituting a wire harness at an interval of about 1 to 5 mm, the flexibility of the wire harness is not impaired, and appearance becomes more attractive. Further, stress is structurally not concentrated on the spiral tube even if distortion occurs during the motion of expansion and contraction, and durability is good even at a low temperature. It has been confirmed that no cracking occurs even after an opening and closing test of 9000 times by the present inventor under a low temperature in similar manner as described above. Thus, the durability is good even under the use condition at a low temperature.

In another aspect of the present invention, the electric wire group of the wire harness may be wrapped by a tape, and the spiral tube may be installed on the outer periphery of the tape to form a sheath. In this case, when the tape is not wrapped by half-wrap winding but is wrapped by about one winding, the flexibility of the wire harness can be maintained.

In other aspects of the present invention, the spiral tube may be formed of a synthetic resin material, the synthetic resin may be a polyethylene, and the spiral tube may be formed from a narrow belt of material having a width of about 10 mm and a thickness of about 1 to 2 mm.

In another aspect of the present invention, a method of protecting an electric wire group of a wire harness is provided. The method includes selecting a portion of the electric wire group that is subject to bending due to relative movement of members on which the electric wire group is mounted, winding a pre-formed spiral tube around the electric wire group to protect the electric wire group from damage while retaining flexibility of the electric wire group and providing an attractive appearance.

In further aspects of the present invention, the method may further include wrapping the electric wire group with tape prior to winding the pre-formed spiral tube around the electric wire group, and the pre-formed spiral tube may be formed from a narrow belt of material having a width of about 10 mm and a thickness of about 1 to 2 mm, and the material may be a synthetic resin, the synthetic resin may be a polyethylene.

BRIEF DESCRIPTION OF THE DRAWINGS

FIGS. 5(A) and (B) are perspective views of a conventional example.

DESCRIPTION OF THE PREFERRED EMBODIMENTS

The mode of operation of the present invention is illustrated below with reference to the drawings.

Figure 1:
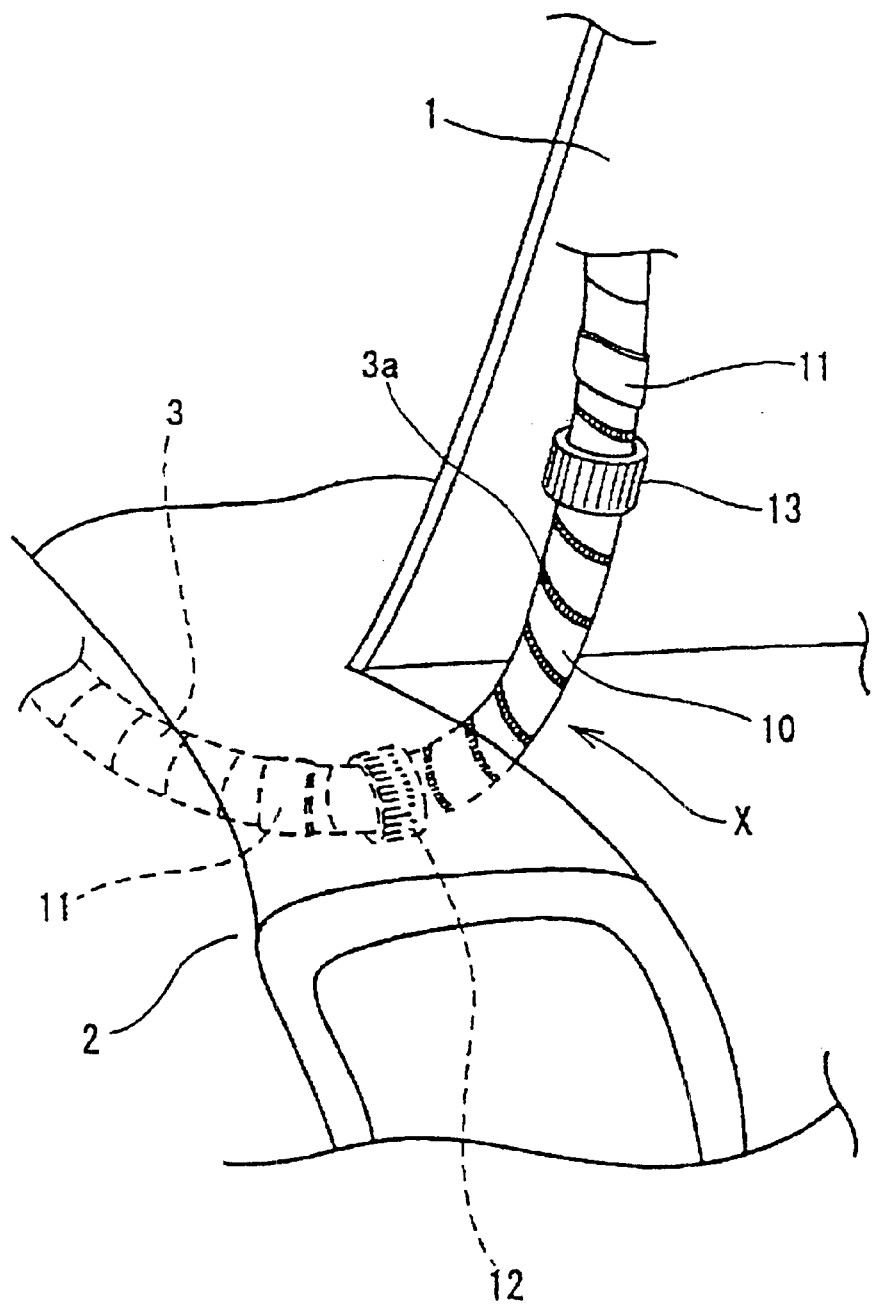
FIG. 1 is a perspective view showing the applied position of a first embodiment of the present invention.
Figure 2:
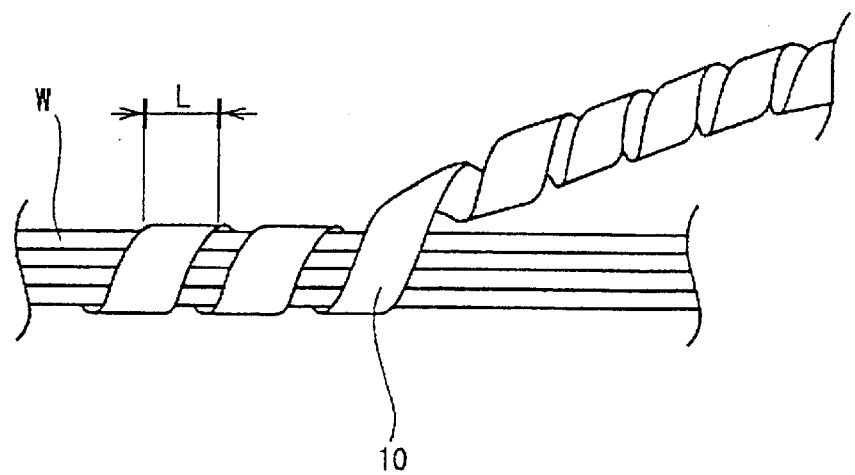
FIG. 2 is a perspective view of a spiral tube according to the first embodiment.
Figure 3:
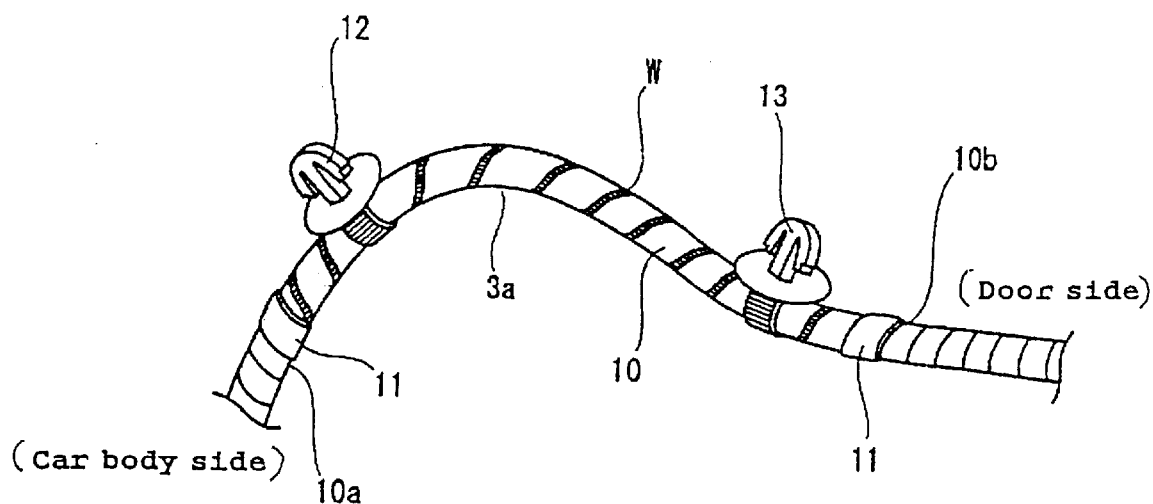
FIG. 3 is an enlarged view of the first embodiment.

The first embodiment, shown in FIG. 1 to FIG. 3, is applied to the transition portion X of the floor harness 3 wired between the automobile body 2 and the luggage compartment door 1, in a manner similar to that described with reference to FIG. 5(B).

A spiral tube 10 is wound on the electric wire group W of a floor harness 3a at the above-mentioned transition portion X. The spiral tube 10 that is spirally wound on the electric wire group W has, for example, a width L of about 10 mm and a thickness of about 1 to 2 mm. However, the spiral tube 10 may have any suitable width and thickness. Both ends 10a and 10b of the spiral tube 10 are fixed to the electric wire group W with an adhesive tape 11.

Further, clamps 12 and 13 are installed adjacent the ends of the spiral tube 10 fixed with the tape 11 to the electric wire group W. The clamp 12 is fixed to the automobile body 2, and on the other hand, the clamp 13 is fixed to the door 1.

The floor harness 3a between the clamp 12 and 13 is bent in an arc-shape and wired, and the bent part is designed to be elongated to follow the opening motion of the door 1.

As described above, when the floor harness 3a bent and wired at the transition portion between the door 1 and the automobile body 2 is sheathed with the spiral tube 10, the trailing property during the opening and closing motion of the door 1 is improved. Further, since the spiral tube 10 has rigidity, damage also does not occur due to interference with peripheral members, and cracking caused by distortion caused by the bending motion does not occur even under use at a low temperature.

Figure 4:
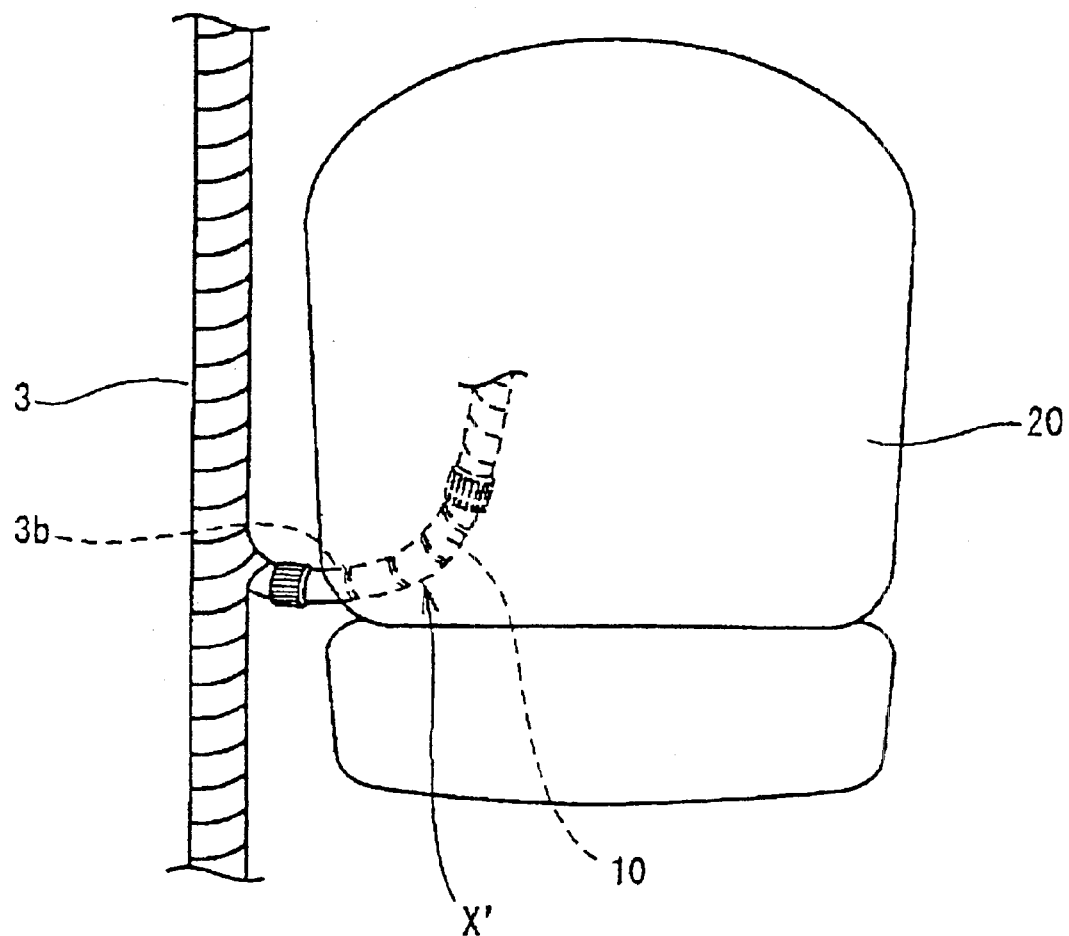
FIG. 4 is a schematic view of a second embodiment of the present invention.
Figure 6:
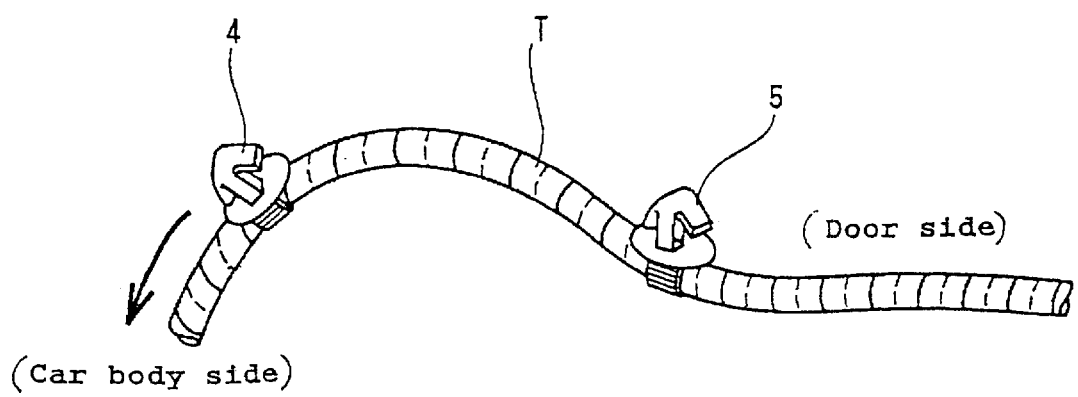
FIG. 6 is an enlarged view of the example of FIG. 5B.

FIG. 4 shows the second embodiment of the present invention, and the spiral tube 10 is installed at the transition portion X' in which the branch line 3b of the floor harness 3 is wired from the floor to a seat 20. In this case also, the transition portion X' is bent and elongated in accordance with the back and forth motion of the seat 20. However, when the branch line 3b is sheathed with the spiral tube 10, the trailing property is good and appearance is also improved.

As clear from the illustration above, according to the present invention, since the transition portion of the wire harness between the automobile body and the mobile article is sheathed with the spiral tube, the motion of expansion and contraction of the wire harness in accordance with the opening and closing motion of the mobile article and transfer is not obstructed, and the sheathed portion can easily trail the motion of the mobile article. Further, cracking does not occur even at a low temperature, durability is obtained, and appearance can be improved over tape winding.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. JP 2000-052921, filed on Feb. 29, 2000, which is expressly incorporated herein by reference in its entirety.

What is claimed is:

1. A structure for wiring a wire harness between an automobile body and a mobile article, wherein the wire harness is flexibly arranged and wired in an flexible manner in accordance with movement of the mobile article relative to the automobile body, said structure comprising:

tape wrapped on an electric wire group of the wire harness;

a spiral tube formed of synthetic resin wound and sheathed over the tape on the electric wire group of the wire harness which is bent and wired at a transition portion between the automobile body and the mobile article;

gaps arranged between successive portions of said spiral tube;

clamps mounted onto said spiral tube in proximity of both an automobile side of said spiral tube and a mobile article side of said spiral tube; and tape wound onto at least one of the automobile side of said spiral tube and the mobile article side of said spiral tube wherein said tape fixes said spiral tube to the wire harness, wherein the automobile side of said spiral tube covering the wire harness is fixed to the automobile body via one clamp and wherein the mobile article side of said spiral tube covering the wire harness is fixed to the mobile article via another clamp, and wherein said spiral tube expands and contracts with movement of the wire harness so as to trail a motion of the mobile article.

2. The structure for wiring a wire harness between an automobile body and a mobile article according to claim 1, wherein the mobile article is a door configured for opening and closing movement relative to the automobile body, and an outer periphery of the electric wire group of the wire harness located at the transition portion between the automobile body and the door is sheathed with said spiral tube.

3. The structure for wiring a wire harness between an automobile body and a mobile article according to claim 1, wherein the mobile article is a seat element configured for movement relative to the automobile body, and an outer periphery of the electric group of wire harness located at a transition portion between the automobile body and the seat is sheathed with said spiral tube.

4. The structure according to claim 1, wherein said spiral tube is formed from a narrow belt of material having a width of about 10 mm and a thickness of about 1 to 2 mm.

5. The structure according to claim 1, wherein said synthetic resin is a polyethylene.

6. A method of protecting an electric wire group of a wire harness, said method comprising:

wrapping tape on an electric wire group of the wire harness;

selecting a portion of the electric wire group that is subject to bending due to relative movement of members on which the electric wire group is mounted;

winding a pre-formed synthetic resin spiral tube around the tape wrapped on the electric wire group to protect the electric wire group from damage while retaining flexibility of the electric wire group and providing an attractive appearance;

providing gaps between successive portions of said spiral tube;

wrapping tape onto at least one of an automobile side of said spiral tube and a mobile article side of said spiral tube wherein said tape fixes said spiral tube to the electric wire group; and mounting clamps onto said spiral tube in proximity of both the automobile side of said spiral tube and the mobile article side of said spiral tube, wherein the automobile side of said spiral tube covering the electric wire group is fixed to the automobile body via one clamp and wherein the mobile article side of said spiral tube covering the electric wire group is fixed to the mobile article via another clamp, and wherein said spiral tube expands and contracts with movement of the wire harness so as to trail a motion of the mobile article.

7. The method according to claim 6, wherein said pre-formed spiral tube is formed from a narrow belt of material having a width of about 10 mm and a thickness of about 1 to 2 mm.

8. The method according to claim 6, wherein said synthetic resin is a polyethylene.

9. The combination of a wire harness and a spiral tube comprising:

tape wrapped on an electric wire group of said wire harness;

said wire harness having one portion coupled to an automobile body via a clamp and another portion coupled to a mobile article via a clamp, whereby a transition portion of the wire harness is arranged between said clamps, wherein the mobile article is movably mounted to the automobile body;

said spiral tube being formed of synthetic resin and being mounted on said wire harness at least in said transition portion and over the tape wrapped on the electric wire group of said wire harness;

tape wrapped onto at least one of an automobile side of said spiral tube and a mobile article side of said spiral tube wherein said tape fixes said spiral tube to the wire harness; and gaps arranged between successive portions of said spiral tube, wherein portions of said wire harness are visible through said gaps in said spiral tube, wherein a width of said gaps changes when the mobile article moves with respect to the automobile body, and wherein said spiral tube expands and contracts with movement of the wire harness so as to trail a motion of the mobile article.

* * * * *